Feb. 18, 1969  S. M. ARENDT  3,427,904
BORING BAR CARTRIDGE
Filed Aug. 31, 1966
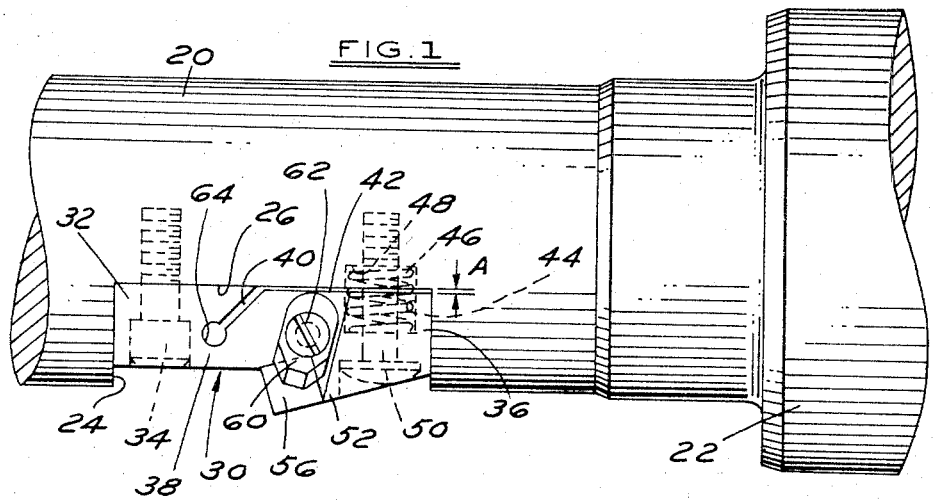
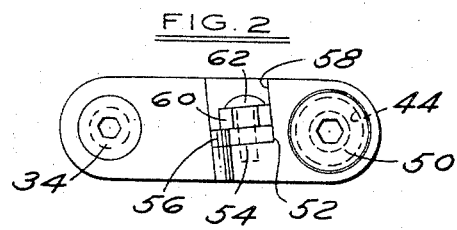
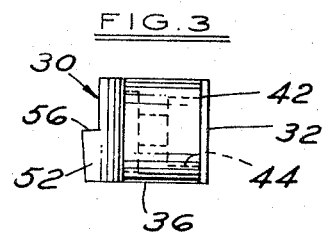
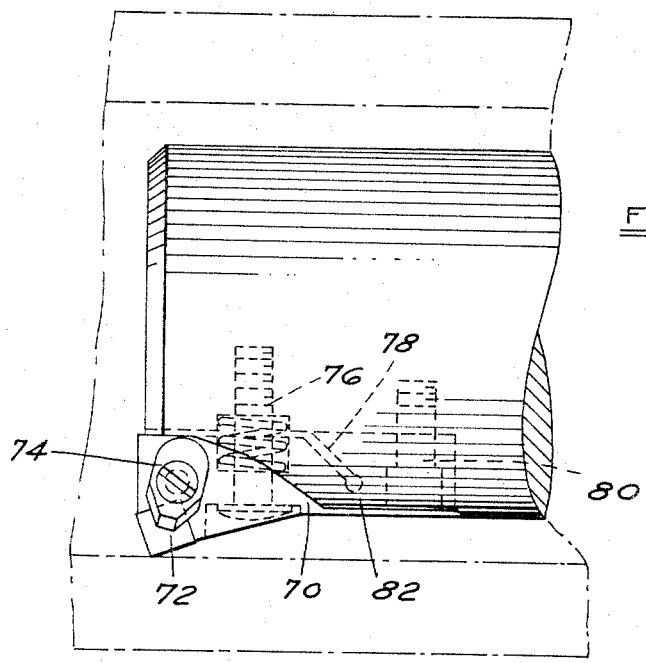
INVENTOR
STANLEY M. ARENDT
BY
Barnes, Kisselle, Raisch & Choate
ATTORNEYS

United States Patent Office 3,427,904
Patented Feb. 18, 1969

1

3,427,904
BORING BAR CARTRIDGE
Stanley M. Arendt, Ferndale, Mich., assignor to Fansteel Inc., North Chicago, Ill., a corporation of New York
Filed Aug. 31, 1966, Ser. No. 576,330
U.S. Cl. 77—58     2 Claims
Int. Cl. B23b 5/00; B23d 77/04

This invention relates to a boring bar construction and more particularly to construction of a boring bar of the type utilizing an applicable cartridge or insert holding block which can be applied to various portions of a prepared boring bar to locate and relocate indexable cutting inserts at desired positions.

Reference is made to Sullivan U.S. Patent No. 3,152,-493, dated Oct. 13, 1964, wherein the general type of boring bar is illustrated and described.

The present invention contemplates an improved insert block which has distinct advantages over previous devices. It is frequently desirable to radially adjust an insert which has been applied to a boring bar. Frequently, a tungsten carbide insert which is carried by the holding block, upon initial use, loses a fresh cutting edge and changes diameter slightly after which it stabilizes dimension for a large number of cuts. It is desirable then, after the insert has been initially used, to be able to adjust it radially.

Also, it is desirable, upon continued wear of the device, to have certain radial adjustment for compensation and, likewise, where extreme accuracy is essential, radial adjustment can be accomplished after trial runs to determine size. In previous devices, some radial adjustment has been accomplished by a radial screw such as shown in the above-referenced Sullivan patent which moves the entire block out from the boring bar. While this was a satisfactory solution, it had a disadvantage that the block was lifted away from the boring bar throughout its entire length and sometimes an unusual strain was placed on the anchoring bolt.

The present invention contemplates an insert holding block which can be solidly anchored over a substantially large area on a rotating tool such as a boring bar. It also contemplates a micro-motion of one end of the unit relative to the other about an integral fulcrum spaced a maximum distance from the point of force application while maintaining an axial stability and without disturbing the basic anchoring forces.

Briefly, this is accomplished by transversely separating a portion of the block from an axially adjacent portion leaving a relatively thick integral continuous portion which permits relative motion between the parts and more particularly between the anchoring part on the cutter body and the insert holding part.

Other objects and features of the invention will be described in the following written description of the invention and of the manner of making and using it, and the specification sets forth the best mode contemplated for the carrying out of the invention.

Drawings accompany the disclosure and the various views thereof may be briefly described as:

FIGURE 1, an elevation of a boring bar assembly showing the various elements of the invention.

FIGURE 2, a side elevation of the insert holding block.

FIGURE 3, an end view of the block.

FIGURE 4, a view of a modified structure showing a different placement of a cutting insert in the block.

*Referring to the drawings*

A body 20 of a boring bar has a driving head 22 and is provided with a suitable recess 24 with a flat base 26. It will be obvious, of course, that many such recesses can be provided around the boring bar as desired or on any revolving cutter body. A holding block 30 for indexable inserts is shown in the recess 24 having one end 32 anchored solidly against the flat surface 26 by bolt 34. The other end 36 is joined to the end 32 by an integral continuous lengthwise portion 38 but separated at the bottom portion of the block by a slot 40.

Also, the bottom surface 42 of the end 36 terminates a short distance from the plane of the bottom surface of the end 32. This differential between the bottom surfaces of the respective ends of the block 30 can be preferably in the range from .030 or .040″. The end 36 is also provided with a recess 44 in the bottom surface to receive a coil compression spring 46 which seats in an aligned recess 48 in the boring bar body 20.

A headed bolt 50 recessed into the block end 36 is concentric with these recesses 44 and 48. The bolt 50 may be what is called a micro-screw with indicia to permit fine adjustment. The outer side of the cartridge block is angled at end 36 outwardly to provide a wider portion 52 which has a seat surface 54 for an indexable insert 56 disposed at a proper working angle for an insert of the tungsten carbide type or a similar hard cutting material. One side of the block 30 is recessed at 58 to receive a clamping element 60 which bears against an insert in a standard way, the clamp being held by a suitable screw 62. In FIGURE 3, an end view of the unassembled block is shown.

It will be noted that the slot 40 is angled from the mounting surface at about 45° and terminates in a transverse hole 64 to remove sharp corners at the point of bending. The angling of the slot has two features. It permits a larger base area for end 32 which is being solidly held to the mounting bar, and it also removes the fulcrum point of the bend as far as possible from the micro-adjusting screw 50. This increases the mechanical advantage and thus makes it possible to leave more metal in the integral joint between the respective ends of the block to maintain a substantially rigid structure.

In assembly as shown in FIGURE 1, the block 30 is inserted in the recess 24 and the end 32 thereof is solidly anchored by the bolt 34. The end 36 is also securely fastened against the pressure of a spring 46 which preferably has a rating of approximately 100 pounds, and the insert 56 is held in place by the clamp 60. The insert may be located and held in a number of different ways common in the art of holding indexable inserts.

It will be seen that the radial position of the cutting corner of the insert 56 can be controlled substantially to the limit of the dimension A as shown in FIGURE 1 by the manipulation of the headed screw 50. Thus, the radial setting can be altered as desired.

The end 36 can, of course, be clamped tight to the boring bar. Then if it is desirable to increase the radial position of the insert this can be done at any time by turning screw 50 outwardly. The resilient connection between the ends 32 and 36 will be sufficient to permit this motion while maintaining the parts in longitudinal stability.

In FIGURE 4, a modified construction is shown in which the holding block 70 containing the insert 72 is positioned at the end of a holding body. The insert, instead of being positioned intermediate the ends of the block, is also positioned at the end held by a clamp 74. In this case, the micro-adjusting screw 76 is intermediate the slot 78 and the insert recess but it performs the same function as described in connection with the structure shown in FIGURE 1. Here also, the slot is angled to result in a maximum base area for the end 80, this resulting in the location of the fulcrum area 82 being at a maximum distance from the microscrew 76.

The adjustment permitted by the above described cartridge block enables an operator to maintain proper diameter and concentricity and to alter these dimensions at will. The spring 46 not only controls the block end 36 but also prevents change of dimension except by intentional movement of microscrew 50.

What I claim is:
1. In a rotating cutter assembly having a body with one or more surfaces to mount an insert holding back, that improvement which comprises:
   (a) an elongate block having a mounting base and a slot formed in said base transversely of said block and angled from said base in a direction toward one end thereof leaving an integral joining section in a top surface thereof of fairly thick proportions to create a bending fulcrum, the end toward which said slot angles serving as a mounting end, and the other end on the other side of said slot serving as an insert mount for a cutting insert,
   (b) means in said mounting end to lock said end solidly on a mounting surface,
   (c) means in the other end to position said other end about said fulcrum in relation to the center of a boring bar, and
   (d) means on said other end for releasably retaining a cutting insert having a cutting edge to be related to a mount in a selected dimension.
2. In a rotating cutter assembly,
   (a) a body having one or more surfaces to mount an insert holding block,
   (b) an elongate block having a mounting base extending along one side at one end of the block and a slot entering said block at said side substantially midway of said block and extending at an angle toward said end and the opposite side of said block and away from the other end of said block and terminating to leave an integral joining section at said opposite side of fairly thick proportions to create a bending fulcrum, the end of said block toward which said slot angles from its entry opening serving as a mounting end, and the other end on the other side of said slot serving as an insert mount for a cutting insert, the mounting end having a mounting surface projecting outwardly beyond the surface of the other end to leave a clearance at said other end relative to a mounting surface of a mounting body,
   (c) a heavy spring interposed between said mounting body and the surface of said other end of said block to urge said other end outwardly,
   (d) means in said mounting end to lock said mounting end solidly on said mounting body,
   (e) means in the other end of said block to move said other end against said spring toward said mounting body, and
   (f) means on said other end for releasably retaining a cutting insert having a cutting edge to be related to said mounting body in a selected dimension.

References Cited

UNITED STATES PATENTS

| 2,266,339 | 12/1941 | Shutz | 77—58.3 |
| 2,998,737 | 9/1961 | Yogus et al. | 77—58.37 |
| 3,190,152 | 6/1965 | Werth | 77—58.3 |
| 3,282,133 | 11/1966 | Dickinson et al. | 77—58.3 |

FOREIGN PATENTS

| 840,340 | 6/1952 | Germany. |

GERALD A. DOST, *Primary Examiner.*

U.S. Cl. X.R.

77—75; 29—98